US008710141B2

(12) United States Patent
Andres et al.

(10) Patent No.: US 8,710,141 B2
(45) Date of Patent: Apr. 29, 2014

(54) POLYAMIDE COMPOSITIONS

(75) Inventors: Olivier Andres, Mions (FR); Florence Clement, Yzeron (FR); Nicolangelo Peduto, Milan (IT)

(73) Assignee: Rhodia Operations, Aubervilliers (FR)

( * ) Notice: Subject to any disclaimer, the term of this patent is extended or adjusted under 35 U.S.C. 154(b) by 407 days.

(21) Appl. No.: 12/934,032

(22) PCT Filed: Mar. 23, 2009

(86) PCT No.: PCT/EP2009/053377
§ 371 (c)(1),
(2), (4) Date: Dec. 23, 2010

(87) PCT Pub. No.: WO2009/118288
PCT Pub. Date: Oct. 1, 2009

(65) Prior Publication Data
US 2011/0086966 A1    Apr. 14, 2011

(30) Foreign Application Priority Data

Mar. 25, 2008  (FR) .................................... 08 01593

(51) Int. Cl.
*C08L 77/00* (2006.01)
(52) U.S. Cl.
USPC ........... 524/538; 524/444; 524/450; 524/541; 524/542

(58) Field of Classification Search
USPC .......................... 524/444, 450, 538, 541, 542
See application file for complete search history.

(56) References Cited

U.S. PATENT DOCUMENTS

| | | | | |
|---|---|---|---|---|
| 6,106,422 | A | * | 8/2000 | Arai ............................. 474/100 |
| 2004/0063857 | A1 | | 4/2004 | Vathauer et al. |
| 2006/0183835 | A1 | | 8/2006 | Hoerold et al. |
| 2010/0062202 | A1 | * | 3/2010 | Procida ...................... 428/36.91 |

FOREIGN PATENT DOCUMENTS

| | | | |
|---|---|---|---|
| EP | | 1626066 B1 | 2/2006 |
| WO | WO 2004/009706 A1 | | 1/2004 |

OTHER PUBLICATIONS

SpecialChem (Alnovol PN 320) Jul. 4, 2012.*
International Search Report corresponding to PCT/EP 2009/053377.

* cited by examiner

*Primary Examiner* — Ling Choi
*Assistant Examiner* — Wenwen Cai
(74) *Attorney, Agent, or Firm* — Dentons US LLP

(57) ABSTRACT

Polyamide compositions and articles shaped therefrom have good dimensional stability and contain at least one novolac resin and nanometric flake structure filler material; the articles shaped therefrom, e.g., by injection molding, are useful in a various of applications, for example as engineering plastics.

20 Claims, No Drawings

POLYAMIDE COMPOSITIONS

CROSS-REFERENCE TO PRIOR APPLICATIONS

This application is a national stage of PCT/EP 2009/053377, filed Mar. 23, 2009 and designating the United States (published in the French language on Oct. 1, 2009, as WO 2009/118288 A1; the title and abstract were also published in English) and claims priority under 35 U.S.C. §119 of FR 0801593, filed Mar. 25, 2008, each hereby expressly incorporated by reference in its entirety and each assigned to the assignee hereof.

The present invention relates to polyamide compositions that have good dimensional stability comprising a novolac resin and fillers with nanoscale sheet structures. The invention also relates to processes for manufacturing such compositions and the uses thereof for producing various articles, especially by injection molding, for various applications.

The applicant has quite surprisingly discovered that the combined use of a novolac resin and of fillers with nanoscale sheet structures makes it possible to obtain a polyamide composition having an increased dimensional stability in a wet environment and at temperature, and good mechanical properties, especially good impact strength.

The main subject of the present invention is a polyamide composition comprising at least one novolac resin and fillers with nanoscale sheet structures.

The composition may comprise from 1 to 25% by weight, particularly from 2 to 10% by weight, more particularly still from 3 to 7% by weight of novolac resin, relative to the total weight of the composition.

The composition may comprise from 0.1 to 15% by weight, particularly from 1 to 10% by weight, more preferably from 1 to 5% by weight of fillers with nanoscale sheet structures relative to the total weight of the composition.

As polyamides that may be used according to the invention, mention may be made of semicrystalline or amorphous polyamides and copolyamides, such as aliphatic polyamides, semiaromatic polyamides and, more generally, linear polyamides obtained by polycondensation of a saturated aliphatic or aromatic diacid and a saturated aromatic or aliphatic primary diamine, polyamides obtained by condensation of a lactam or an amino acid, or linear polyamides obtained by condensation of a mixture of these various monomers. More specifically, these copolyamides may be, for example, polyhexamethylene adipamide, polyphthalamides obtained from terephthalic and/or isophthalic acid, and copolyamides obtained from adipic acid, hexamethylenediamine and caprolactam.

According to one preferential embodiment of the invention, the composition comprises at least one polyamide selected from the group consisting of the polyamide PA-6, the polyamide PA-6,6, the polyamide PA-6,10, the polyamide PA-11, the polyamide PA-12, the polyamide PA-6,12, poly (meta-xylylenediamine) (MXD6), the polyamide PA-6,6/6T, the polyamide PA-6,6/6I, and blends and copolyamides, such as the copolyamide PA-6/6,6 for example.

The composition of the invention may also comprise copolyamides derived especially from the above polyamides, or blends of these polyamides or copolyamides.

The preferred polyamides are polyhexamethylene adipamide, polycaprolactam, or copolymers and blends of polyhexamethylene adipamide and polycaprolactam.

The polyamide matrix may especially be a polymer comprising star-shaped or H-shaped macromolecular chains and, where appropriate, linear macromolecular chains. Polymers comprising such star-shaped or H-shaped macromolecular chains are described, for example, in documents FR 2 743 077, FR 2 779 730, U.S. Pat. No. 5,959,069, EP 0 632 703, EP 0 682 057 and EP 0 832 149.

According to another particular variant of the invention, the polyamide matrix of the invention may be a polymer of random tree type, preferably a copolyamide having a random tree structure. These copolyamides of random tree structure and the process for obtaining them are described especially in document WO 99/03909. The matrix of the invention may also be a composition comprising a linear thermoplastic polymer and a star-shaped, H-shaped and/or tree-type thermoplastic polymer as described above. The matrix of the invention may also comprise a hyperbranched copolyamide of the type described in document WO 00/68298. The composition of the invention may also comprise any combination of linear, star-shaped, H-shaped or tree-type hyperbranched copolyamide thermoplastic polymer as described above.

The composition according to the invention preferentially contains from 40% to 95% by weight of polyamide, in particular from 40% to 80% by weight, relative to the total weight of the composition. The polyamide composition may also comprise one or more other polymers, preferably thermoplastic polymers such as polyamide, polyolefins, ABS or polyester.

Novolac resins are generally compounds of polyhydroxyphenol type, for example products of condensation of phenolic compounds with aldehydes. These condensation reactions are generally catalyzed with an acid.

The phenolic compounds may be chosen, alone or as a mixture, from phenol, cresol, xylenol, naphthol, alkylphenols, for instance butylphenol, tert-butylphenol or isooctylphenol; or any other substituted phenol. The aldehyde most frequently used is formaldehyde. However, others may be used, such as acetaldehyde, para-formaldehyde, butyraldehyde, crotonaldehyde or glyoxal.

According to one particular embodiment of the invention, the resin is a product of condensation of phenol and formaldehyde.

The generic molecular structure of phenol-formaldehyde resin is especially as follows:

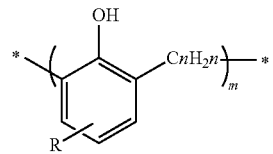

in which:
R may be a hydrogen atom or a hydrocarbon-based group, comprising, in particular, from 1 to 10 carbon atoms;
n is between 1 and 3; and
m is between 2 and 15 and preferentially between 2 and 10.

The novolac resins used advantageously have an upper molecular weight of between 500 and 3000 g/mol and preferably between 800 and 2000 g/mol.

Commercial novolac resins that may especially be mentioned include the commercial products Durez®, Vulkadur® and Rhenosin®.

The novolac resin may be added directly to the molten polyamide as is or via a masterbatch, especially in a polymer composition, preferably a polyamide composition.

The composition according to the invention also comprises fillers with nanoscale sheet structures which may be in various forms.

The expression "fillers with nanoscale sheet structures" is understood to mean fillers comprising or composed of nanoscale sheets, or nanosheets, that is to say sheets that have their smallest dimension of the order of a nanometer, in particular a thickness between 0.1 and 5 nm.

These nanosheets customarily have a length between 100 and 500 nm, and a thickness between 0.1 and 5 nm.

These fillers generally have an aspect ratio of greater than 50, preferably of greater than 100. The expression "aspect ratio" is understood to mean the ratio between the largest dimension characteristic of the shape of the fillers and the smallest dimension characteristic of the shape of the fillers.

These fillers may be in various forms in the polyamide matrix. They may, for example, be in the form of individual nanoscale sheets, or a disordered agglomerate of individual nanoscale sheets. These fillers may also be in a form close to their natural form, that is to say in the form of a stack of nanoscale sheets. These stacks may be said to be intercalated by organic or inorganic compounds as mentioned above. It is also possible that the fillers according to the invention are in the polyamide matrix in the form of agglomerates of stacks of nanoscale sheets.

In the composition according to the invention, said fillers may be in various forms depending on the method of incorporation used.

These fillers are dispersed in the polyamide composition of the invention. The dispersion may be of greater or lesser quality.

The nanoscale sheets are generally obtained from a compound that has a structure made up of sheets. In particular, during the preparation of the composition or of the polymer, the sheets may separate from one another to thus form nanoscale sheets.

The geometry of the fillers, namely their shapes and dimensions, may be observed in the compositions by microscopy, or be likened to that of the sheets of the compound from which they are obtained. As mentioned above, it is possible that the separation of the sheets is not complete and that agglomerates are present in the composition.

The separation of the sheets is often referred to as exfoliation, dissociation and/or delamination. The processes which are involved during this separation may be different depending on the compounds used and/or the methods used. They generally lead to fillers being obtained that have nanoscale sheet structures with a relatively high aspect ratio.

The fillers with nanoscale sheet structures may be chosen from several families. Mention may especially be made of fluoromicas, zirconium phosphates, silicates, more particularly phyllosilicates and hydrotalcites.

As silicate-type fillers suitable for the implementation of the invention, mention is made of montmorillonites, smectites, illites, sepiolites, palygorskites, muscovites, allervardites, amesites, hectorites, talcs, fluorohectorites, saponites, beidellites, nontronites, stevensites, bentonites, micas, fluoromicas, vermicullites, fluorovermicullites, halloysites. These compounds may be of natural, synthetic or modified natural origin.

Montmorillonites are very particularly preferred, especially those with a thickness between 0.5 and 5 nm, that have a diameter between 50 and 600 nm. Such montmorillonites may have an aspect ratio greater than 100.

The separation of the sheets may be promoted by a pretreatment using an organic or inorganic compound, for example to increase the distance between the sheets. The nature of the treatment may depend on the nature of the compound with sheet structure. By way of example, mention may be made of treatments with oniums, that is to say substituted phosphoniums or ammoniums, for the treatment of montmorillonites. Montmorillonites that are already treated are commercially available. Many treatments and/or processes for incorporating compounds with sheet structure into thermoplastics, for example into polyamide, have been described.

For the treatment of the compounds with sheet structure, such as montmorillonites, mention is made, in particular, of treatments via exchange of cations contained initially in the compound. These are, for example, organic cations of onium type. The organic cations may be chosen from phosphoniums and ammoniums, for example primary to quaternary ammoniums. Mention may be made, for example, of protonated amino acids such as 12-aminododecanoic acid protonated with ammonium, protonated primary to tertiary amines and quaternary ammoniums. The chains attached to the nitrogen or phosphorus atom of the onium may be aliphatic, aromatic, arylaliphatic, linear or branched and may have oxygen-containing units, for example hydroxy or ethoxy units. Mention may be made, by way of example of organic ammonium treatments of dodecylammonium, octadecyl ammonium, bis (2-hydroxy-ethyl)octadecylmethylammonium, dimethyldioctadecyl-ammonium, octadecylbenzyldimethylammonium, tetramethyl-ammonium. Mention may be made, by way of example of phosphonium organic treatments, of alkyl phosphoniums such as tetrabutylphosphonium, trioctyloctadecylphosphonium, octadecyltriphenylphosphonium. These lists are in no way limiting.

The compounds with sheet structure may also be treated with saturated or unsaturated fatty acids or derivatives thereof or salts thereof and/or with silicone or siloxane derivatives. Mention may especially be made of application US 2007/0072980.

According to one preferred embodiment of the invention, the compositions are composed of polyamide resin and of fillers having exfoliated, or partly exfoliated, nanoscale sheet structures, dispersed in the resin, obtained by intercalation or exfoliation of a phyllosilicate, for example a montmorillonite that has previously undergone a treatment, especially a swelling by ion exchange. Examples of swelling treatments which may be used are, for example, described in patent EP 0 398 551. All the treatments known for promoting exfoliation of phyllosilicates in a polymer matrix may be used. It is possible, for example, to use a clay treated with an organic compound sold by Laporte under the trademark Cloisite®. It is also possible to use montmorillonite-based clays sold by Nanocor under the Nanomer® range. It is also possible to use montmorillonites treated and sold by Süd Chemie under the Nanofil® range.

Any method that makes it possible to obtained a dispersion of fillers with exfoliated nanoscale sheet structures in a polymer may be used to implement the invention. Generally, processes of in situ polymerization or of melt blending with the polyamide are used.

A first process consists in mixing the compound with sheet structure to be dispersed, which is optionally treated, for example with a swelling agent, with the monomers of the polyamide in the polymerization medium, then in polymerizing. In this case, the polymer is preferably polyamide. Therefore, the fillers with nanoscale sheet structures which are optionally treated are introduced into a medium comprising polyamide monomers then the mixture is polymerized in order to obtain a polyamide comprising exfoliated nanocomposite fillers.

Another process consists in mixing with the polyamide either the compound with sheet structure to be dispersed, which is optionally treated, for example with a swelling agent, or the fillers with nanoscale sheet structures which are already exfoliated and optionally treated, and in optionally subjecting the mixture to a high shear, for example in a twin-screw extrusion device, in order to achieve a good dispersion. The polymer in question is understood either to be one of the compounds taken individually, preferably polyamide, or to be the mixture of the various compounds of the composition. The compound with a sheet structure may especially be added in the form of a masterbatch, for example in a polymer composition, especially polyamide composition, intended to be blended with the polyamide in order to form the polyamide composition according to the invention.

Another process consists in blending a concentrated mixture of a polymer and of fillers with nanoscale sheet structures that are exfoliated, prepared for example according to one of the processes described previously, with a molten polymer.

To improve the mechanical properties of a polyamide composition according to the invention, it may be advantageous to add thereto at least one reinforcing and/or bulking filler preferentially selected from the group consisting of fibrous fillers such as glass fibers, carbon fibers and aramid fibers, non-fibrous mineral fillers such as clays, kaolin, mica, wollastonite and silica. The level of incorporation of reinforcing and/or bulking filler is in accordance with the standards in the field of composite materials. It may be, for example, an amount of filler of from 1% to 80%, preferably from 10% to 70% and especially between 20% and 50%.

The composition according to the invention may also comprise additives usually used for the manufacture of polyamide compositions intended to be molded. Thus, mention may be made of lubricants, flame retardants, plasticizers, nucleating agents, catalysts, resilience improvers, for instance optionally grafted elastomers, light and/or heat stabilizers, antioxidants, antistatic agents, dyes, pigments, matting agents, molding agents or other conventional additives.

In particular, a polyamide composition constituted of:
a novolac resin;
fillers with nanoscale sheet structures;
reinforcing or bulking fillers; and
additives selected from the group consisting of lubricants, plasticizers, nucleating agents, catalysts, resilience improvers, light and/or heat stabilizers, antioxidants, antistatic agents, dyes, pigments, matting agents, and molding agents, is preferred.

The composition may also comprise electrically conductive or antistatic fillers; preferably selected from the group consisting of: conductive carbon black, a metal, an antistatic agent, graphite, glass and/or a mineral filler coated with a layer of metal, and/or a mixture thereof, preferably conductive carbon black. Conductive carbon black is described, in particular, in "Carbon Black", Second Edition, Revised and Expanded, Science and Technology, edited by J B. Donnet, R C Bansal and M J Wang, Marcel Dekker Inc., pages 271-275.

For the preparation of a polyamide composition, these fillers and additives may be added to the polyamide via conventional means suited to each filler or additive, for instance during the polymerization or by melt blending. The novolac resin is preferentially added to the polyamide as a melt, especially during a step of extrusion of the polyamide, or as a solid in a mechanical mixer; the solid mixture may then be melted, for example via an extrusion process.

The polyamide composition according to the invention is especially used as a matrix, especially for obtaining articles, especially molded articles. This composition is preferably a molding powder.

The compositions according to the invention may be used as raw material in the field of engineering plastics, for example for the preparation of articles obtained by injection molding, by injection blow molding, by extrusion or by extrusion blow molding. According to a common embodiment, the modified polyamide is extruded in the form of rods, for example in a twin-screw extrusion device, which are then chopped into granules. The molded components are then prepared by melting the granules produced above and feeding the molten composition into injection-molding devices.

The present invention also relates to the use of a composition as defined above in the manufacture of an article intended in particular to be painted by an electrostatic process for the deposition of paint. These articles can be produced in particular by molding, injection molding, extrusion or extrusion blow molding. These articles are particularly appropriate for "inline" and "online" electrostatic painting processes used in the motor vehicle industry.

The paint can be applied to the article, for example, by spraying or immersion. Generally, a process for the application of paint to an article by electrostatic deposition comprises at least the following stages: cataphoresis treatment of the article at temperatures in particular of between 150 and 220° C., optionally application of a primer by electrostatic spraying and, finally, application of the paint by electrostatic spraying. Each spraying stage can be followed by stage(s) of heating at temperatures of between 100 and 200° C., and by stage(s) of cooling.

The present invention also relates to an article painted by a process for the application of paint by electrostatic deposition.

These articles according to the invention can, for example, be motor vehicle parts, in particular bodywork parts, pipes intended for the transportation of fluids or gases, tanks, filters, coatings, films and/or plastic covers of tanks.

Specific language is used in the description so as to facilitate the understanding of the principle of the invention. It should, however, be understood that no limitation of the scope of the invention is envisioned by the use of this specific language. Modifications, improvements and perfections may especially be envisioned by a person skilled in the art of the technical field in question on the basis of his own general knowledge.

The term "and/or" includes the meanings "and", "or" and also all the other possible combinations of the elements connected to this term.

Other details and advantages of the invention will emerge more clearly in the light of the examples below, which are given purely for indicative purposes.

EXPERIMENTAL SECTION

Compounds used:
PA: PA-6,6 of SB 27 AD1 type from Rhodia, having a VI of 135 to 145 ml/g according to standard ISO 307;
Novolac: phenol-formaldehyde resin—Rhenosin PR95 supplied by Rhein Chemie;
Fillers: Nanofil SE3010 supplied by Süd Chemie;
Additives: calcium stearate lubricant and Irganox B1171 heat stabilizer.

Compositions based on PA-6,6 are obtained by extrusion on a ZSK40 twin-screw extruder, adding variable amounts of fillers relative to the total weight of the composition.

The processing characteristics are as follows:
Twin-screw extruder: W&P ZSK40, with
temperature profile (° C.) zone 1 (start) zone 8 (head): 260, 260, 260, 260, 265, 270, 270, 280;

screw speed (rpm): 260
motor torque (N/m): from 28 to 35 depending on the compositions;
vacuum (bar): −0.9

Test specimens are prepared by injection molding with the following geometry: ISO 527 multipurpose test specimens and 60 mm×60 mm×2 mm sheets, with a 50 tonne DEMAG press.

The processing conditions are as follows:
50 tonne DEMAG press, 35 mm screw
T (° C.) barrel: from 250 to 270
T (° C.) mold: 80
injection speed (cc/s): 40
injection pressure (bar): 150
hold pressure (bar): 40
back pressure (bar): 15
screw speed (rpm): 160

Various properties are measured and mentioned in Table 1.

The Charpy unnotched impact strength is measured according to standard ISO 179/1eU.

Measurement of the CLTE (Coefficient of Linear Thermal Expansion): these tests were carried out on a Zwick Z020 tensile testing machine under the following conditions:
Temperature ramp: 0.5° C./min. Longitudinal direction of the test specimen.
Test specimens heated in an oven for 1 h 30 min at 160° C. before the test.

The elongation of the test specimen is monitored in the longitudinal direction, and the CLTE is obtained at any point by the derivative of the curve of elongation as a function of temperature.

60 mm×60 mm×2 mm sheets are dried at 95° C., for 12 hours under vacuum. They are weighed and immersed in water preheated to 100° C. At regular intervals, they are wiped and weighed until their weight becomes constant. The weight is recorded as a function of the time. The dimensional variation is measured in the direction parallel and perpendicular to the direction of injection using a vernier caliper.

TABLE 1

| Composition | Novolac (wt %) | Fillers (wt %) | Dimensional variation (%) | Charpy unnotched impact (kJ/m$^2$) | CLTE at 100° C. ($10^{-5}$ m/m. ° C.) |
|---|---|---|---|---|---|
| C1 | 0 | 0 | 1.735 | 82 | 10.9 |
| C2 | 5 | 0 | 1.300 | 62 | — |
| C3 | 0 | 5 | 1.255 | 58 | — |
| 1 | 5 | 2.5 | 0.935 | 82 | — |
| 2 | 5 | 5 | 0.860 | 83 | 8.2 |

It is thus observed that the compositions according to the invention have very good dimensional stability in a wet environment and at temperature (reduced CLTE) and good impact strength mechanical properties.

The invention claimed is:

1. A polyamide composition consisting of:
   at least one polyamide;
   at least one novolac resin;
   a filler material having nanoscale sheet structures;
   reinforcing or bulking fillers; and
   additives selected from the group consisting of lubricants, plasticizers, nucleating agents, catalysts, resilience improvers, light stabilizers, heat stabilizers, antioxidants, antistatic agents, dyes, pigments, matting agents, and molding agents;
   wherein the novolac resin is present in the composition in an amount of from 1% to 25% by weight relative to the total weight of the composition.

2. The polyamide composition as defined by claim 1, wherein the novolac resin is present in the composition in an amount of from 2% to 10% by weight relative to the total weight of the composition.

3. The polyamide composition as defined by claim 1, wherein the novolac resin is present in the composition in an amount of from 3% to 7% by weight relative to the total weight of the composition.

4. The polyamide composition as defined by claim 1, wherein the filler material having nanoscale sheet structures comprises montmorillonites; wherein the filler material having nanoscale sheet structures is present in the composition in the amount of from 0.1% to 15% by weight of the total weight of the composition; wherein the filler material having nanoscale sheet structures has a length ranging from 100 nm to 500 nm and a thickness ranging from 0.1 nm to 5 nm; or wherein the filler material having nanoscale sheet structures has been treated with at least one member selected from the group consisting of oniums, saturated fatty acids and salts and derivatives thereof, unsaturated fatty acids and salts and derivatives thereof, derivatives of siloxanes, and derivatives of silicones.

5. The polyamide composition as defined by claim 1, wherein the at least one polyamide is selected from the group consisting of polyamide PA-6, polyamide PA-6,6, polyamide PA-6,10, polyamide PA-12, polyamide PA-6,12, poly(mtea-xylylenediamine-adipic) (MXD6), polyamide PA-6,6/6T, polyamide PA-6,6/6I, and blends and copolyamides thereof.

6. The polyamide composition as defined by claim 1, wherein the filler material having nanoscale sheet structures is selected from the group consisting of: fluoromicas, zirconium phosphates, silicates, phyllosilicates and hydrotalcites.

7. A polyamide composition consisting of:
   at least one polyamide;
   at least one novolac resin;
   a filler material having nanoscale sheet structures;
   reinforcing or bulking fillers; and
   additives selected from the group consisting of lubricants, plasticizers, nucleating agents, catalysts, resilience improvers, light stabilizers, heat stabilizers, antioxidants, antistatic agents, dyes, pigments, matting agents, and molding agents;
   wherein the at least one polyamide is selected from the group consisting of polyamide PA-6, polyamide PA-6,6, polyamide PA-6,10, polyamide PA-11, polyamide PA-12, polyamide PA-6,12, poly(meta-xylylenediamine-adipic acid) (MXD6), polyamide PA-6,6/6T, polyamide PA-6,6/6I, and blends and copolyamides thereof.

8. The polyamide composition as defined by claim 7, wherein the filler material having nanoscale sheet structures is selected from the group consisting of: fluoromicas, zirconium phosphates, silicates, phyllosilicates and hydrotalcites.

9. The polyamide composition as defined by claim 7, wherein the filler material having nanoscale sheet structures comprises montmorillonites; wherein the filler material having nanoscale sheet structures is present in the composition in the amount of from 0.1% to 15% by weight of the total weight of the composition; wherein the filler material having nanoscale sheet structures has a length ranging from 100 nm to 500 nm and a thickness ranging from 0.1 nm to 5 nm; or wherein the filler material having nanoscale sheet structures has been treated with at least one member selected from the group consisting of oniums, saturated fatty acids and salts and derivatives thereof, unsaturated fatty acids and salts and derivatives thereof, derivatives of siloxanes, and derivatives of silicones.

10. A polyamide composition consisting of:
   at least one polyamide;
   at least one novolac resin;
   a filler material having nanoscale sheet structures;
   reinforcing or bulking fillers; and
   additives selected from the group consisting of lubricants, plasticizers, nucleating agents, catalysts, resilience improvers, light stabilizers, heat stabilizers, antioxidants, antistatic agents, dyes, pigments, matting agents, and molding agents;
   wherein the filler material having nanoscale sheet structures comprises montmorillonites.

11. The polyamide composition as defined by claim 10, wherein the filler material having nanoscale sheet structures is present in the composition in the amount of from 0.1% to 15% by weight of the total weight of the composition.

12. The polyamide composition as defined by claim 10, wherein the filler material having nanoscale sheet structures is present in the composition in the amount of from 1% to 10% by weight of the total weight of the composition.

13. The polyamide composition as defined by claim 10, wherein the filler material having nanoscale sheet structures is present in the composition in the amount of from 1% to 5% by weight of the total weight of the composition.

14. The polyamide composition as defined by claim 10, said filler material having nanoscale sheet structures having been treated with at least one member selected from the group consisting of oniums, saturated and unsaturated fatty acids and salts and derivatives thereof, and derivatives of siloxanes, and derivatives of silicones.

15. A process for preparing the polyamide composition as defined by claim 1,
   said process comprising adding the resin(s) and filler material to at least one monomer of the polyamide in a polymerization medium therefor, and then polymerizing said monomers.

16. A process for preparing the polyamide composition as defined by claim 1,
   said process comprising mixing the polyamide with either a compound having a structure made of sheets to be dispersed, or with a filler material having exfoliated nanoscale sheet structures.

17. An article shaped from a polyamide composition as defined by claim 1, by injection molding, by injection blow molding, by extrusion or by extrusion blow molding.

18. An article shaped from a polyamide composition as defined by claim 1, and painted via an electrostatic paint decomposition process.

19. An article shaped from a polyamide composition as defined by claim 1.

20. An article shaped from a polyamide composition as defined by claim 1, comprising an engineering plastic.

* * * * *